US006007072A

United States Patent [19]

Yoon

[11] Patent Number: 6,007,072

[45] Date of Patent: Dec. 28, 1999

[54] VEHICLE SUSPENSION SYSTEM WITH ROLL CENTER CONTROL

[75] Inventor: Young-Whan Yoon, Namyangiu, Rep. of Korea

[73] Assignee: Mando Machinery Corporation, Gunpo, Rep. of Korea

[21] Appl. No.: 08/935,703

[22] Filed: Sep. 23, 1997

[30] Foreign Application Priority Data

Oct. 31, 1996 [KR] Rep. of Korea ...................... 96-50791

[51] Int. Cl.[6] .............................. B06G 7/02; B06G 17/00

[52] U.S. Cl. ................. 280/5.514; 280/5.52; 267/140.12

[58] Field of Search ............................... 280/5.516, 5.52, 280/5.523, 5.524, 5.514, 5.508, 124.106, 124.144; 267/140.12, 140.15

[56] References Cited

U.S. PATENT DOCUMENTS 4,440,254 4/1984 Shibahata et al. .................... 280/5.508
4,687,223 8/1987 Miyoshi et al. ..................... 280/5.516
4,717,175 1/1988 Arai et al. .............................. 280/5.52
5,577,771 11/1996 Lee ......................................... 280/5.52
5,725,202 3/1998 Nakamura et al. ................ 267/140.12

*Primary Examiner*—Peter C. English
*Attorney, Agent, or Firm*—Staas & Halsey LLP

[57] ABSTRACT

The present invention is directed to a suspension system for a vehicle. The system includes a wheel carrier rotatably supporting a wheel, a strut assembly connecting an upper end of the wheel carrier to a vehicle body, a lower control arm connecting a lower end of the wheel carrier to the vehicle body, and roll center control part for controlling a height of a roll center of the vehicle. The roll center control part includes a hydraulic source for generating hydraulic pressure, a hydraulic bushing disposed between the lower arm and the vehicle body, the hydraulic bushing having upper and lower chambers, first and second hydraulic control valves for controlling hydraulic pressure directed to or exhausted from the upper and lower chambers, respecively, whereby the hydraulic pressure is displaced upward and downward with respect to an axis of the vehicle body, and an electronic control unit for controlling the first and second hydraulic control valves in response to a driving state of the vehicle.

13 Claims, 9 Drawing Sheets

VEHICLE SUSPENSION SYSTEM WITH ROLL CENTER CONTROL

BACKGROUND OF THE INVENTION (1) Field of the Invention

The present invention relates to a suspension system for a vehicle and, more particularly, to a suspension system which can improve controllability and stability of the vehicle, ride comfort and the ability of the driver to control the vehicle by automatically controlling a height of a roll center in accordance with a driving state of the vehicle.

(2) Description of Related Art

The primary functions of a suspension system are to (1) provide vertical compliance so wheels can follow an uneven road, thereby isolating a vehicle body from roughness in the road, (2) maintain the wheels in proper steer and camber attitudes to the road surface, (3) react to control forces produced by tires-longitudinal acceleration and braking forces, lateral force, and braking and driving torques, (4) resist roll of the vehicle body, and (5) keep the tires in contact with the road with minimal load variations.

Particularly, rolling occurs on the basis of a predetermined point, called a roll center, when the vehicle is cornering. The variation rate of the height of the roll center has an effect on the running safety and handling of the vehicle.

That is, rolling of the vehicle occurs when the height of a gravitational center of the vehicle body becomes higher than that of the roll center. If the height of the roll center is lowered, it is easy to optimize camber and tread changes such that vibration from the road can be minimized to improve high-speed straight driving performance and safety, as well as ride comfort.

However, when cornering, as lateral force is produced, it becomes difficult to control the vehicle. This acts to diminish the safety of the vehicle.

To solve this problem, it is possible to raise the height of the roll center to increase resistance against rolling such that a shorter anti-roll bar can be used. Doing this, however, enlarges changes of the camber and tread such that the ride comfort and straight running safety are deteriorated.

Accordingly, it is very important to optimally set the height of the roll center by compromising between the two characteristics when designing the suspension system.

Referring to FIG. 7, there is shown a schematic view illustrating a conventional suspension system which is designed to variably control the height of the roll center. The suspension system comprises a wheel carrier 2 rotatably supporting a wheel 1; a strut assembly 3 consisting of a shock absorber 30 and a spring 31 and connecting the upper side of the wheel carrier 2 to a vehicle body 10; and a lower arm 4 connecting the lower side of the wheel carrier 2 to the vehicle body 10.

The suspension system further comprises a hydraulic bushing 50 disposed between the lower arm 4 and the vehicle body 10, a hydraulic source 60 generating hydraulic pressure, a 4-port 3-position center bypass type directional control valve 51 for controlling hydraulic pressure directed to the hydraulic bushing 50, and a control unit 52 for controlling the directional control valve 51 in response to signals from a lateral acceleration sensor 520 and a vehicle speed sensor 521.

FIG. 8 is a sectional view illustrating the hydraulic bushing 50 depicted in FIG. 7. The hydraulic bushing 50 comprises an inner tube 500 connected to the vehicle body 10, an outer tube 501 connected to the lower arm 4, and an elastic member 503 disposed between the inner and outer tubes 500 and 501. Two fluid chambers 504 and 505 connected to the directional control valve 51 through first and second fluid conduits 510 and 511, respectively, are formed within the elastic member 503.

In the above described suspension system, the directional control valve 51 directs hydraulic pressure to one of the chambers 504 and 505 of the elastic member 503 in accordance with a control of the control unit 52 receiving signals from the lateral acceleration and vehicle speed sensors 520 and 521 according to a vehicle's driving condition. At this point, one of the chambers 504 and 505 where the hydraulic pressure is directed expands, while the other of the chambers 504 and 505 where the hydraulic pressure is not directed contracts. As a result, the outer tube 501 connected to the lower arm 4 is displaced relative to the inner tube 500 connected to the vehicle body 10. Namely, the vehicle body side connecting portion of the lower arm 4 is displaced upwardly and downwardly with respect to the vehicle body 10, thereby varying the height of the roll center to improve the running safety and handling of the vehicle.

However, in the above described suspension system, since a large amount of hydraulic pressure is required to expand and retract the elastic member, the expanding chamber is applied with high pressure such that it is easy for the hydraulic bushing to be damaged.

In addition, when the vehicle is in a normal driving condition, the two chambers are supplied with equal levels of hydraulic pressure. However, it is difficult for the directional control valve to maintain the equal levels of hydraulic pressure. For example, in a state where the first conduit 510 is supplied with hydraulic pressure and the second conduit 511 is not supplied with hydraulic pressure, when the directional control valve 51 is displaced into a neutral position, since the first and second conduits 510 and 511 are closed, the pressures within the chambers becomes unequal.

The inherent function of the hydraulic bushing is that it absorbs vibration generated by the wheels. However, if the directional control valve is displaced into the neutral position, since both of the conduits are closed and the level of hydraulic pressure within the chambers is kept, the rigidity of the hydraulic bushing is increased due to the non-compression characteristics of the fluid, deteriorating the vibration absorbing characteristics of the bushing.

SUMMARY OF THE INVENTION

Therefore, the present invention has been made in an effort to solve the above described problems of the conventional art.

It is a first object of the present invention to provide a suspension system which can improve handling, stability and ride comfort by automatically controlling a height of a roll center in accordance with a driving state of the vehicle.

It is a second object of the present invention to provide a hydraulic bushing which can easily expand and retract when controlling the roll center and can be prevented from being damaged by outer force.

To achieve the above first object, the present invention provides a suspension system for a vehicle. The system includes a wheel carrier rotatably supporting a wheel, a strut assembly connecting an upper end of the wheel carrier to a vehicle body, a lower control arm connecting a lower end of the wheel carrier to the vehicle body, and a roll center control part for controlling a height of a roll center of the vehicle. The roll center control part includes a hydraulic source for generating hydraulic pressure, a hydraulic bushing disposed between the lower arm and the vehicle body, the hydraulic bushing having upper and lower chambers, first and second hydraulic control valves for controlling hydraulic pressure directed to or exhausted from the upper and lower chambers, respecively, whereby the hydraulic bushing is displaced upward and downward with respect to an axis of the vehicle body, and an electronic control unit for controlling the first and second hydraulic control valves in response to a driving state of the vehicle.

To achieve the above second object, the present invention provides a hydraulic bushing used in a suspension system having at least one lateral arm connecting a wheel carrier to a vehicle body, said hydraulic busing being interposed between the lower arm and the vehicle body. The hydraulic bushing comprises an outer tube connected to the lower arm, an inner tube connected to the vehicle body, an elastic member disposed between the inner and outer tubes, a housing surrounding the elastic member, upper and lower fluid chambers defined by the housing and the elastic member, a plurality of pins embedded in the elastic member, and a plurality of grooves formed on opposite end surfaces of the elastic member.

It is preferable that a stopper is formed on a middle portion of the inner tube and extending toward the upper and lower chambers so as to prevent the bushing from being damaged by outer pressure.

It is also preferable that a plurality of circumferential seal projections are formed around the elastic member and contacting the housing, thereby preventing fluid leakage caused by a repeated expanding and retracting operation of the hydraulic bushing.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENT

Figure 1:
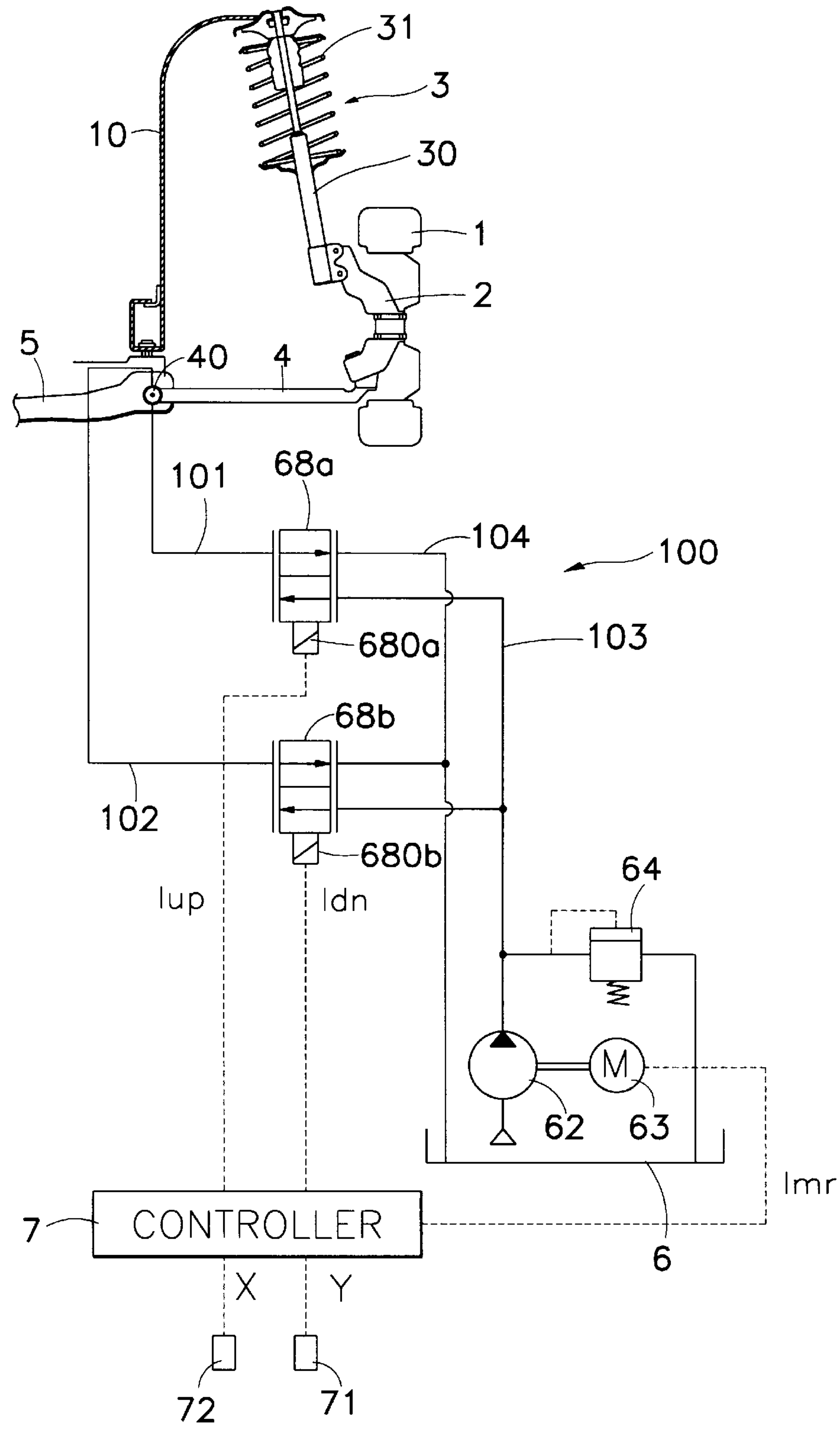
FIG. 1 is a schematic view of a suspension system in accordance with a preferred embodiment of the present invention.
Figure 2:
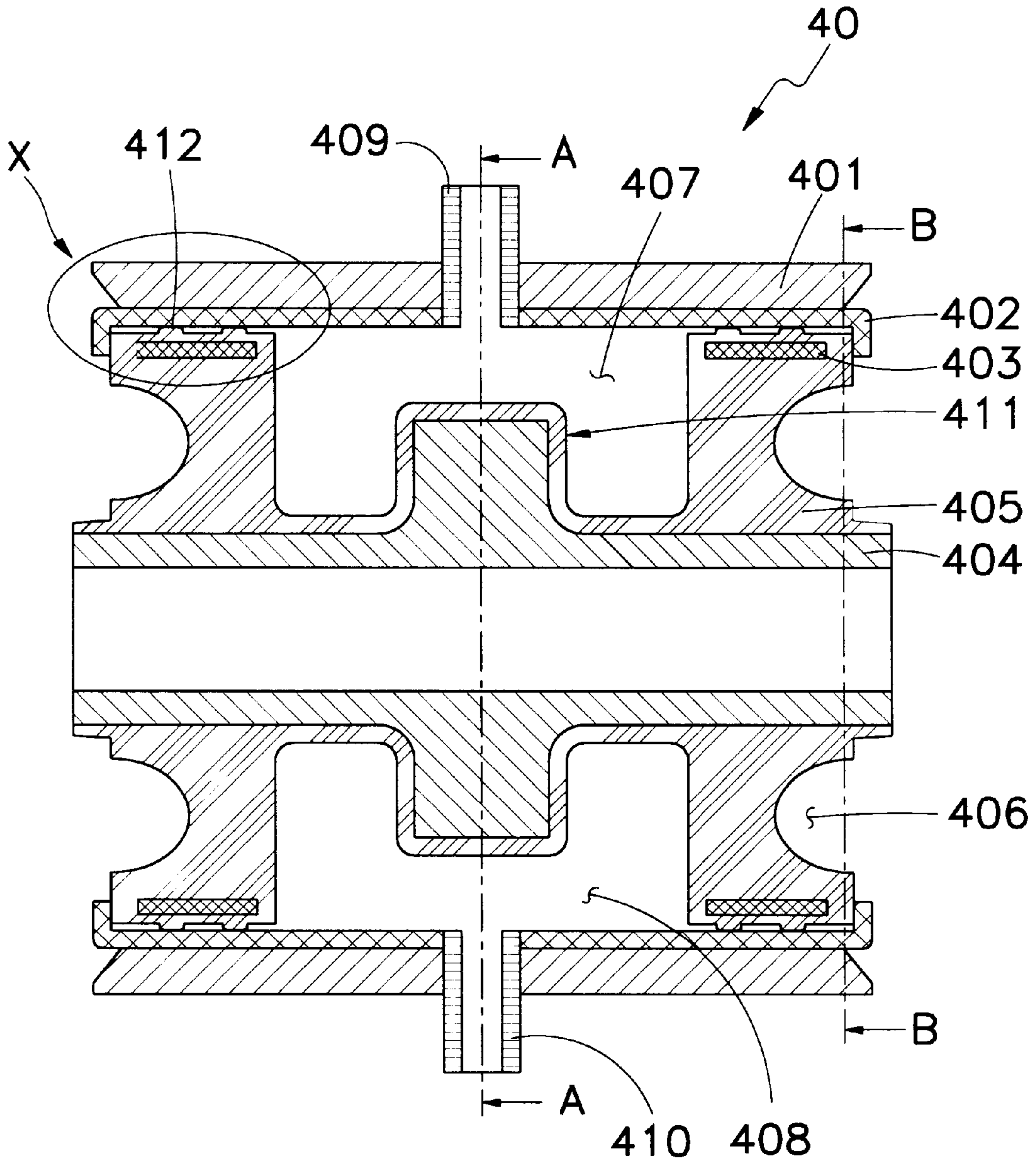
FIG. 2 is a sectional view of a hydraulic bushing applied to the suspension system.

The following is the description of the preferred embodiments according to the present invention. In the drawings, like reference numerals have been used to identify like elements in each Figure.

Referring first to FIG. 1, there is shown a schematic view of a suspension system in accordance with a preferred embodiment of the present invention. The suspension system comprises a wheel carrier 2 rotatably supporting a wheel 1; a strut assembly 3 consisting of a shock absorber 30 and a spring 31 and connecting the upper side of the wheel carrier 2 to a vehicle body 10; and a lower arm 4 connecting the lower side of the wheel carrier 2 to the vehicle body 10.

When the wheel 1 bumps and rebounds along the moving trace determined by a length of the lower arm 4, the strut assembly 3 absorbs shocks caused by the bump and rebound of the wheel 1.

In the present invention as described above, there is provided roll center control means disposed between the vehicle body-side connecting portion of the lower arm 4 and the vehicle body 10. The roll center control means comprises a hydraulic bushing 40 and a hydraulic control part 100 for controlling the hydraulic bushing 40.

As shown in FIGS. 2, 3*a*, 3*b* and 3*c*, the hydraulic bushing 40 comprises an outer tube 401 connected to the lower arm 4, an inner tube 404 connected to the vehicle body 10, an elastic member 405 disposed between inner and outer tubes 404 and 401, a housing 402 surrounding the elastic member 405, upper and lower fluid chambers 407 and 408 defined by the housing 402 and the elastic member 405, a plurality of pins 403 (or an insert plate) embedded in the elastic member 405, a plurality of grooves 406 formed on opposite end surfaces of the elastic member 405, a stopper 411 formed on a middle portion of the inner tube 404 and extending toward the upper and lower chambers 407 and 408, fittings 409 and 410 respectively connected to the upper and lower chambers 407 and 408, and a plurality of circumferential seal projections 412 formed around the elastic member 405 and contacting the housing 402 so as to prevent fluid leakage caused by repeated expanding and retracting of the hydraulic bushing 40.

Referring again to FIG. 1, the hydraulic bushing 40 is controlled by a hydraulic control part comprising a fluid tank 6, a hydraulic pump 62, a motor 63 driving the hydraulic pump 62, a vehicle speed sensor 71, a lateral force sensor 72, first and second hydraulic control valves 68*a* and 68*b* respectively having first and second duty-controlled solenoids 680*a* and 680*b* for feeding and exhausting hydraulic pressure to and from the upper and lower chambers 407 and 408 of the hydraulic bushing 40, an electronic control unit 7 for controlling the hydraulic control valves 68*a* and 68*b* in response to signals detected by the sensors 71 and 72, a relief valve 64 for maintaining system pressure, and internal conduits 101, 102, 103 and 104.

Figure 6:
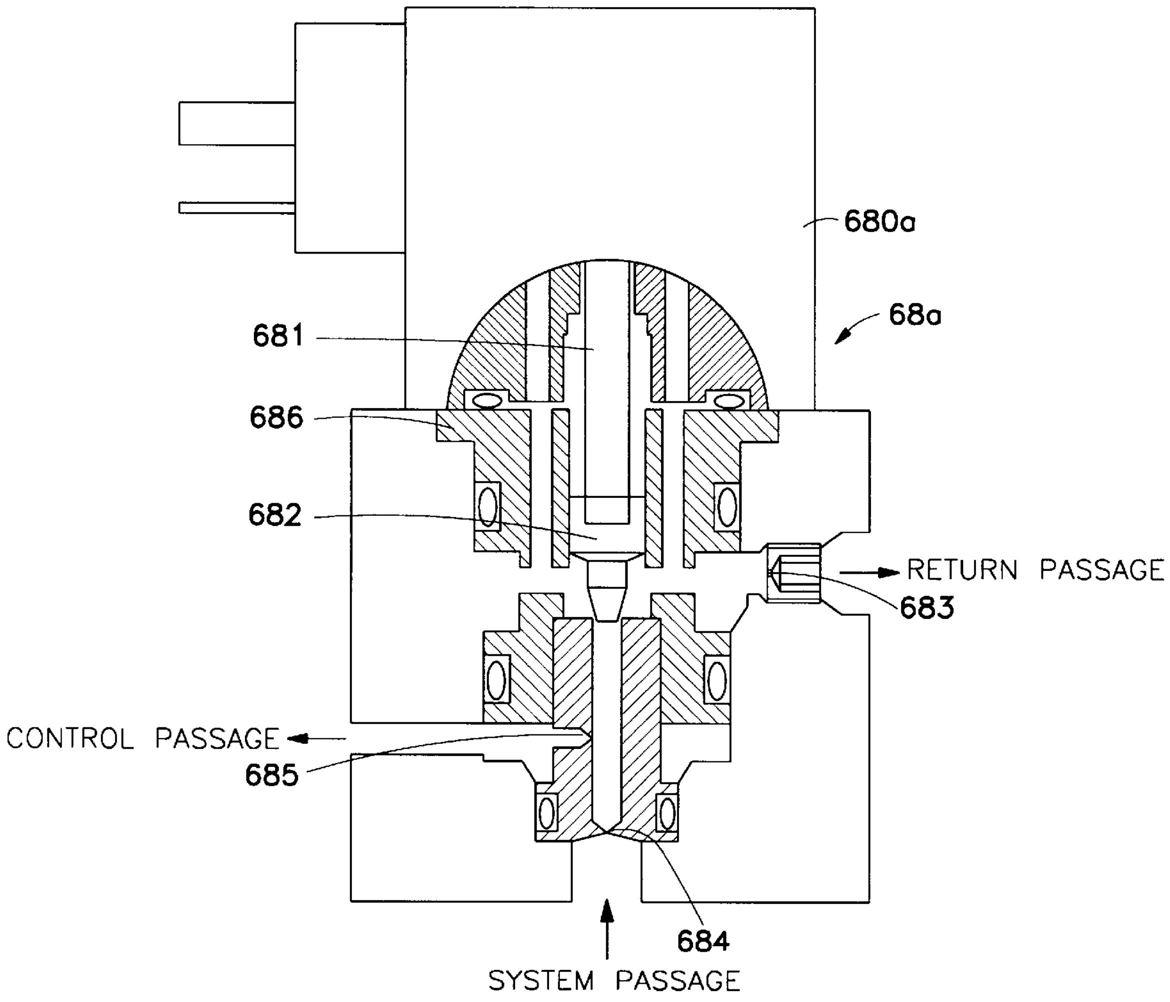
FIG. 6 is a sectional view illustrating a hydraulic control valve according to a preferred embodiment of the present invention.
Figure 7:
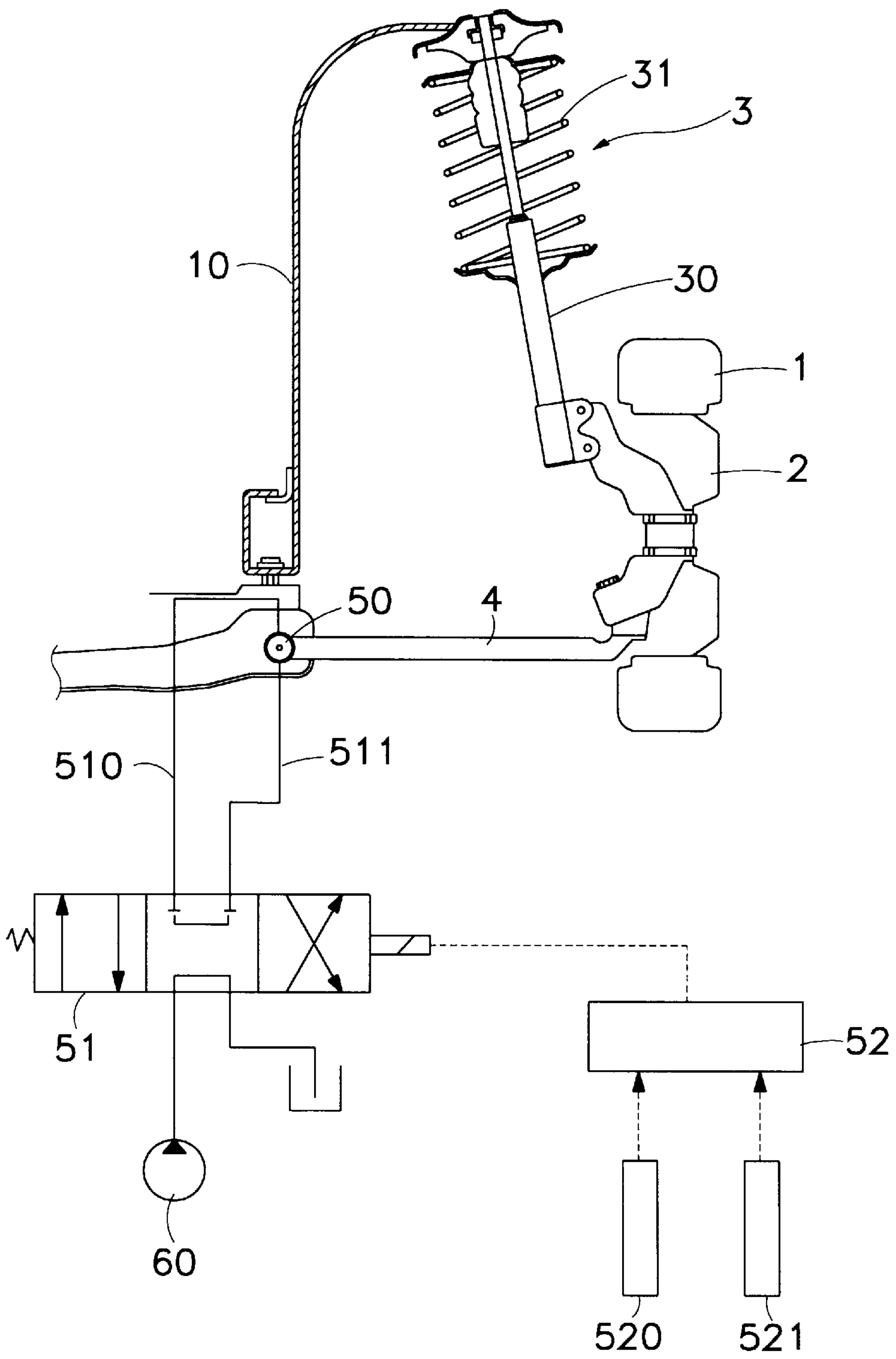
FIG. 7 is a schematic view illustrating a conventional suspension system.
Figure 8:
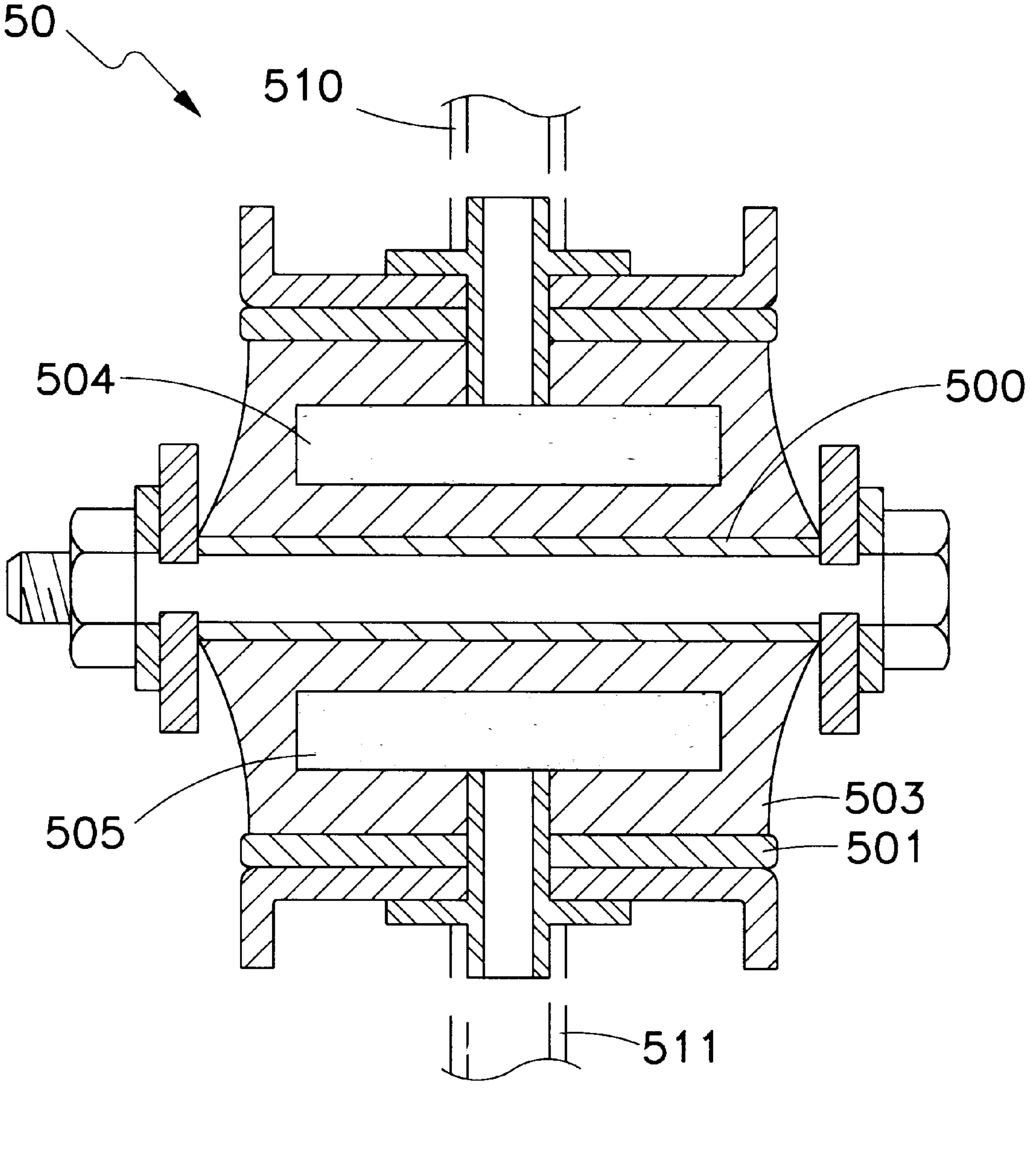
FIG. 8 is a sectional view illustrating a conventional hydraulic bushing.

As shown in FIG. 6, each of the hydraulic control valves 68*a* and 68*b* comprises a sleeve 681, a poppet 682, a poppet fitting 686 and orifices 683, 684 and 685.

Figure 4:
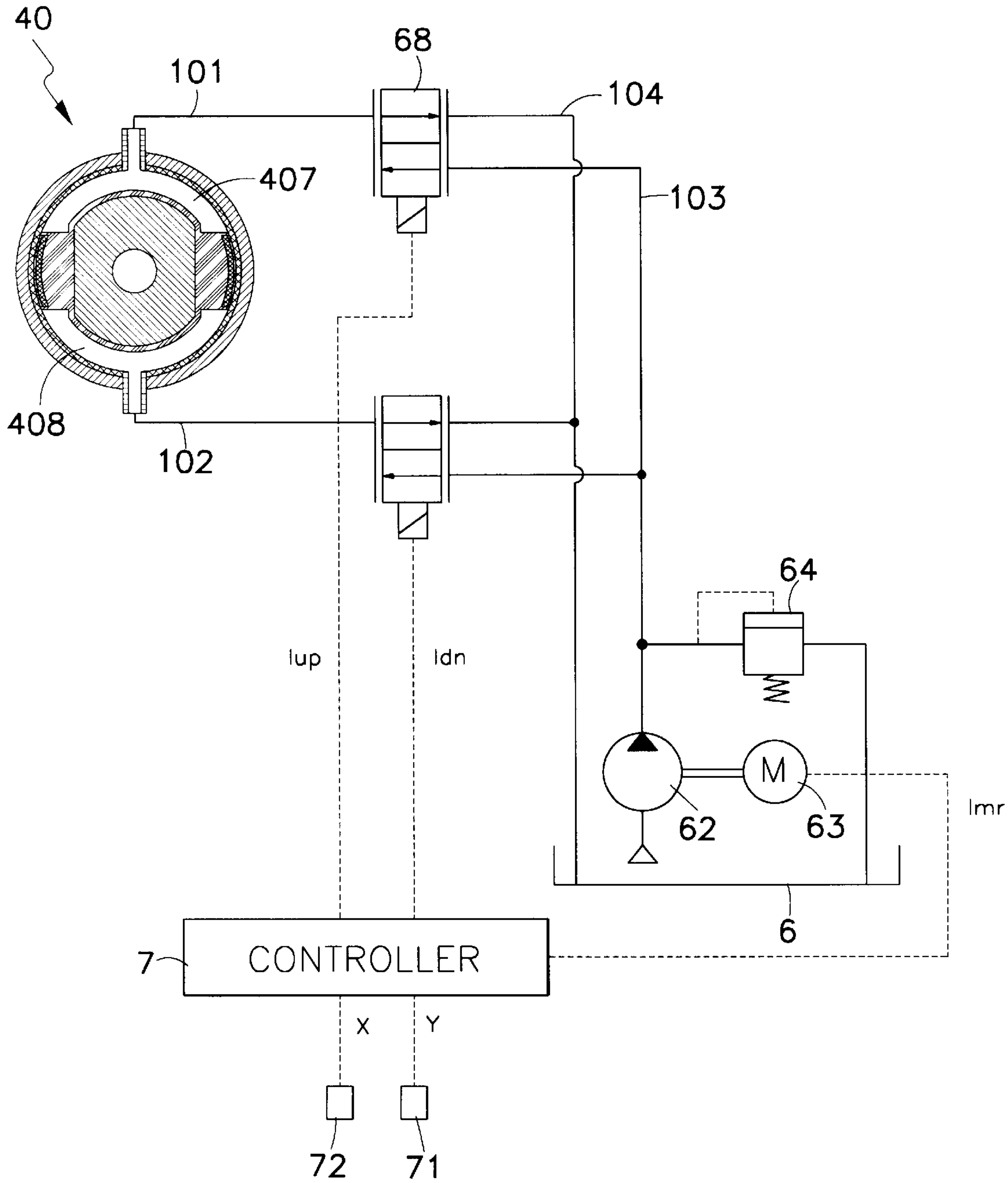
FIG. 4 is a schematic diagram illustrating a hydraulic bushing control device of a preferred embodiment of the present invention.

In the above described suspension, a method for controlling elastic coefficient of the hydraulic bushing will be described hereinafter with reference to FIG. 4.

When control signals Iup, Idn and Imr, output by the central unit based on signals detected by the sensors 71 and 72 in accordance with the driving state of the vehicle, are transmitted from the electronic control unit 7 to the hydraulic control valves 68*a* and 68*b* and the motor 63, respectively, the pressure directed to the upper and lower chambers 407 and 408 is controlled in accordance with the signals. That is, if the pressure within the upper and lower chambers 407 and 408 is controlled to a high state, the hydraulic bushing becomes hard, and if controlled to a low state, the hydraulic bushing becomes soft. Accordingly, by controlling the elastic coefficient of the hydraulic bushing according to the driving state of the vehicle, the vibration transmitted from the lower arm to the vehicle body can be reduced. In addition, since each of the hydraulic control valves includes the duty-controlled solenoid fluid supply rate can be appropriately controlled.

Figure 5A:
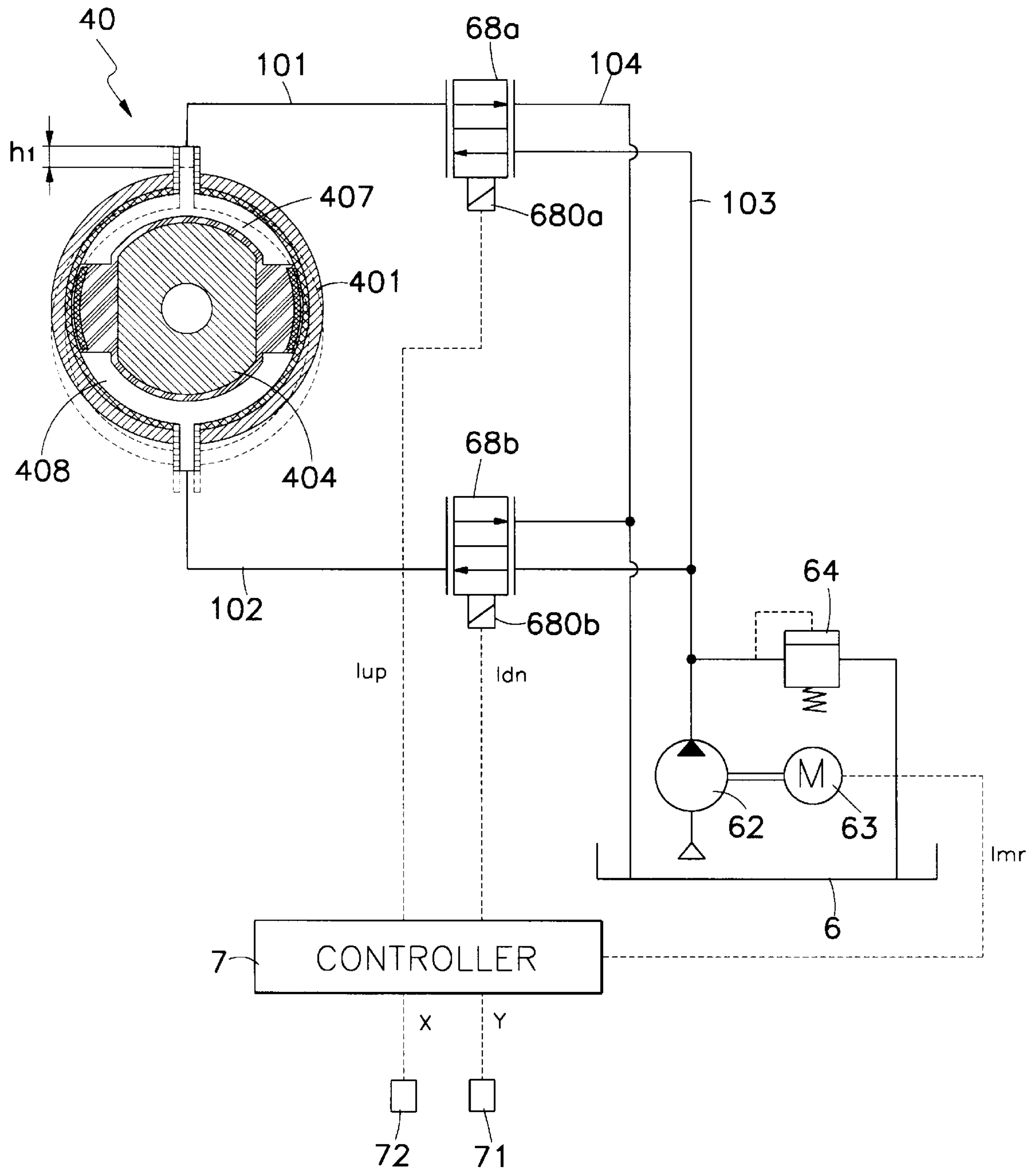
FIGS. 5*a* and 5*b* are schematic views for illustrating how the suspension system of the embodiment may operate.

FIG. 5*a* shows a roll center control state of the above described suspension system when the vehicle is driving in a straight line at high speed range (above 80 km/h).

Generally, when the vehicle is driving in a straight line at high speed range, if the height of the roll center is lowered, it is easy to optimize the camber and tread changes such that the vibration from the road can be minimized. As a result, high speed running performance and safety, as well as the ride comfort, are improved.

Therefore, when the signals, reflecting high-speed and straight driving are detected by the vehicle speed sensor 71 and the lateral force sensor 72 and transmitted to the electronic control unit 7, the electronic control unit 7 compares these signals with data preset therein and transmits the compared signals Iup, Idn and Imr to the hydraulic control valves 68*a* and 68*b* and the motor 63, respectively, whereby the motor 63 drives the hydraulic pump 62 to generate hydraulic pressure and the first and second hydraulic control valves 68*a* and 68*b* are displaced as shown in FIG. 5*a* such that hydraulic pressure is supplied to the lower chamber 408 through the conduits 103 and 102 via the second hydraulic control valve 68*b* and hydraulic pressure within the chamber 407 is exhausted to the fluid tank 6 through the conduits 101 and 104 via the first hydraulic control valve 68*a*.

As a result, the outer tube 401 of the hydraulic bushing 40 is displaced as shown in a broken line with respect to the inner tube 404 fixed on the vehicle body by a bolt (not shown), thereby lowering the vehicle body side connecting portion of the lower arm 4 by h1 to lower the roll center.

Figure 5B:
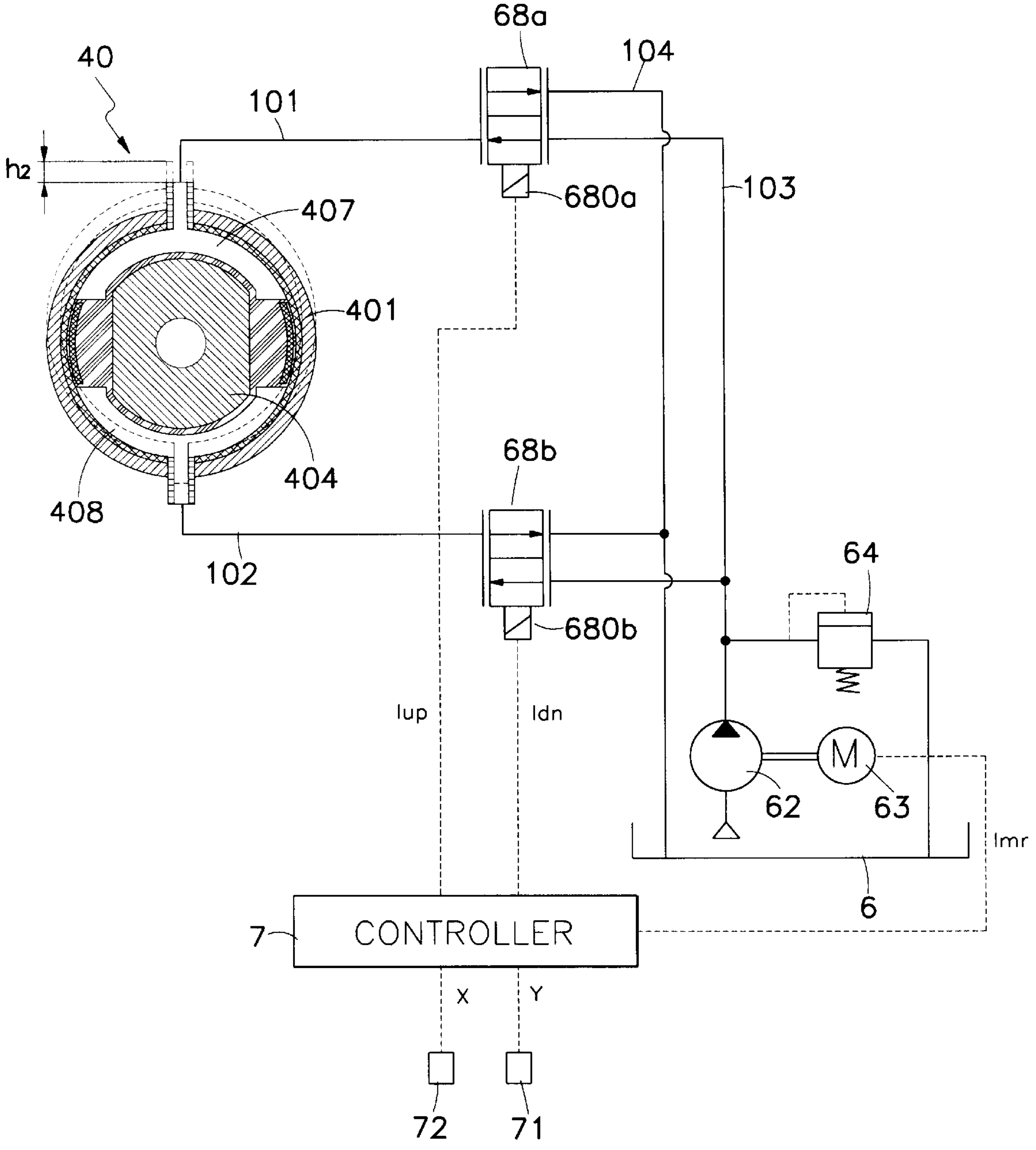

FIG. 5*b* shows a roll center control state of the above described suspension system when lateral force is induced to the vehicle body during cornering.

When the vehicle receives a lateral force occurring, for example, when cornering, it is preferable to raise the roll center to improve cornering safety and handling.

Therefore, when the signals on the lateral force detected by the vehicle speed sensor 71 and the lateral force sensor 72 are transmitted to the electronic control unit 7, the electronic control unit 7 compares these signals with data preset therein and transmits the compared signals Iup, Idn and Imr to the hydraulic control valves 68*a* and 68*b* and the motor 63, respecively, whereby the motor 63 drives the hydraulic pump 62 to generate hydraulic pressure and the hydraulic control valves 68*a* and 68*b* are displaced as shown in FIG. 5*b* such that hydraulic pressure is supplied to the upper chamber 407 through the conduits 101 and 103 via the first hydraulic control valve 68*a* and hydraulic pressure within the chamber 408 is exhausted to the fluid tank 6 through the conduits 102 and 104 via the hydraulic control valve 68*b*.

As a result, the outer tube 401 of the hydraulic bushing 40 is displaced upward as shown with a broken line with respect to the inner tube 404 fixed on the vehicle body by a bolt (not shown), thereby raising the vehicle body side connecting portion of the lower arm 4 by h2 to raise the roll center.

In addition, when the electronic control unit 7 malfunctions, since the signals Iup, Idn, Imr are not transmitted from the electronic control unit 7 to the hydraulic control valves 68*a* and 68*b* and the motor 63, the conduits are disconnected from the hydraulic source, and the hydraulic pressure within the upper and lower chambers 407 and 408 is drained to the fluid tank 6 through the hydraulic control valves 68*a* and 68*b*. As a result, the elastic characteristics of the hydraulic bushing become soft such that the vibration transmitted from the lower arm to the vehicle body can be reduced.

Generally, to expand and retract the elastic member in accordance with hydraulic pressure induced into the chambers of the hydraulic bushing, high pressure is required. However, in the present invention, by forming grooves 406 on the elastic member 405, the elastic member 405 can be expanded and retracted using relatively lower pressure.

Figure 3A:
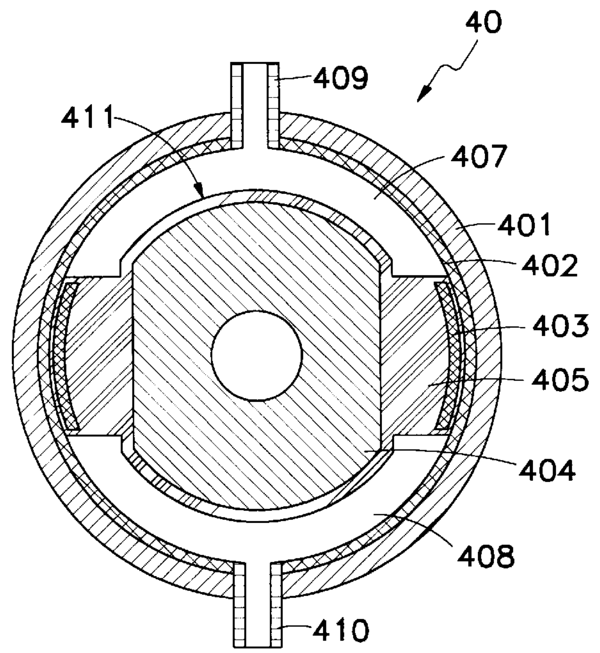
FIG. 3*a* is a sectional view taken along line 3*a*—3*a* of FIG. 2.
Figure 3B:
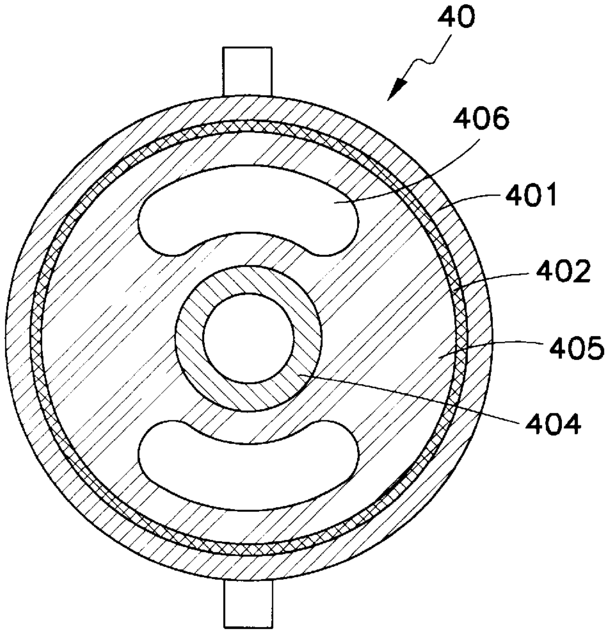
FIG. 3*b* is a sectional view taken along line 3*b*—3*b* of FIG. 2.
Figure 3C:
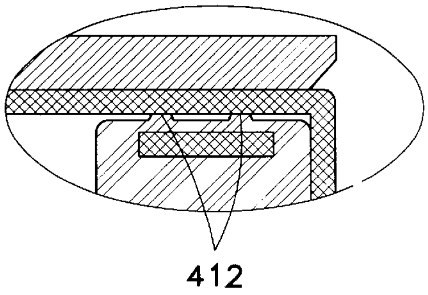
FIG. 3*c* is an enlarged view of a circled portion 3*c* of FIG. 2.

In addition, there may be a leak between the housing 402 and the elastic member 405 by the repeated expansion and retraction of the elastic member 405. However, in the present invention, as shown in FIG. 3*c*, the circumferential seal projections 412 can prevent the leakage.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A suspension system for a vehicle, comprising:

a wheel carrier rotatably supporting a wheel;

a strut assembly connecting an upper end of the wheel carrier to a vehicle body;

a lower control arm connecting a lower end of the wheel carrier to the vehicle body; and roll center control means for controlling a height of a roll center of the vehicle, said roll center control means comprising:

a hydraulic source for generating hydraulic pressure;

a hydraulic bushing disposed at a connection between the lower control arm and the vehicle body, said hydraulic bushing having upper and lower chambers;

first and second hydraulic control valves for controlling hydraulic pressure directed to or exhausted from the upper and lower chambers, respectively, whereby the connection is displaced upward and downward with respect to an axis of the vehicle body; and an electronic control unit for controlling the first and second hydraulic control valves in response to a driving state of the vehicle.

2. The suspension system according to claim 1, wherein the hydraulic bushing comprises:

an outer tube connected to the lower arm;

an inner tube connected to the vehicle body;

an elastic member disposed between the inner and outer tubes;

a housing surrounding the elastic member;

wherein the upper and lower fluid chambers are defined by the housing and the elastic member;

a plurality of insert plates embedded in the elastic member; and a plurality of grooves formed on opposite end surfaces of the elastic member.

3. The suspension system of claim 2, wherein the hydraulic bushing further comprises a stopper formed on a middle portion of the inner tube and extending toward the upper and lower chambers so as to prevent the bushing from being damaged by outer pressure.

4. The suspension system of claim 2, wherein the hydraulic bushing further comprises a plurality of circumferential seal projections formed around the elastic member and contacting the housing, thereby preventing fluid leakage caused by repeated expanding and retracting of the hydraulic bushing.

5. The suspension system of claim 1, wherein the hydraulic source comprises a fluid tank, a hydraulic pump, a motor for driving the pump, and a relief valve for maintaining system pressure.

6. The suspension system of claim 1, wherein the electronic control unit receives signals on the driving state of the vehicle from a vehicle speed sensor and a lateral force sensor, and transmits control signals to the hydraulic source and the first and second hydraulic control valves.

7. The suspension system of claim 1, wherein each of the hydraulic control valves includes a duty-controlled solenoid.

8. A roll center control system of an automotive suspension system having at least one lateral arm, comprising:

a hydraulic source for generating hydraulic pressure;

a hydraulic bushing disposed at a connection between the lateral arm and a vehicle body, said hydraulic bushing having upper and lower chambers;

first and second hydraulic control valves for controlling hydraulic pressure directed to or exhausted from the upper and lower chambers, respectively, whereby the connection is displaced upward and downward with respect to an axis of the vehicle body; and an electronic control unit for controlling the first and second hydraulic control valves in response to a driving state of a vehicle.

9. The roll center control system according to claim 8, wherein the hydraulic bushing comprises:

an outer tube connected to the lateral arm;

an inner tube connected to the vehicle body;

an elastic member disposed between the inner and outer tubes;

a housing surrounding the elastic member, wherein the upper and lower fluid chambers are defined by the housing and the elastic member;

a plurality of insert plates embedded in the elastic member; and a plurality of grooves formed on opposite end surfaces of the elastic member.

10. The roll center control system of claim 9, wherein the hydraulic bushing further comprises a stopper formed on a middle portion of the inner tube and extending toward the upper and lower chambers so as to prevent the bushing from being damaged by outer pressure.

11. The roll center control system of claim 9, wherein the hydraulic bushing further comprises a plurality of circumferential seal projections formed around the elastic member and contacting the housing, thereby preventing fluid leakage caused by a repeated expanding and retracting operation of the hydraulic bushing.

12. The roll center control system of claim 8, wherein the hydraulic source comprises a fluid tank, a hydraulic pump, a motor for driving the pump, and a relief valve for maintaining system pressure.

13. The roll center control system of claim 8, wherein the electronic control unit receives signals on vehicle running conditions from a vehicle speed sensor and a lateral force sensor and transmits control signals to the hydraulic source and the first and second hydraulic control valves.

* * * * *